United States Patent

[11] 3,601,698

[72] Inventor Milton E. Thurman, Jr.
 550 S.E. 26th Avenue, Hillsboro, Oreg. 97123
[21] Appl. No. 792,445
[22] Filed Jan. 21, 1969
[45] Patented Aug. 24, 1971

[54] SEMICONDUCTOR TESTER HAVING VISUAL DISPLAY
 10 Claims, 3 Drawing Figs.
[52] U.S. Cl. .................................... 324/158 T,
 324/158 D, 340/324 R
[51] Int. Cl. .................................... G01r 31/26,
 G08b 23/00
[50] Field of Search .......................... 324/158,
 51, 158 T, 158 D, 116, 115, 140; 340/324

[56] References Cited
 UNITED STATES PATENTS

| | | | | |
|---|---|---|---|---|
| 2,868,997 | 1/1959 | Mitchell | | 324/158 UX |
| 2,895,106 | 7/1959 | Taunt | | 324/158 |
| 3,431,494 | 3/1969 | Ryan | | 324/158 |
| 1,981,548 | 11/1934 | Haven | | 324/115 X |
| 2,132,256 | 10/1938 | Cameron | | 324/116 |

Primary Examiner—Rudolph V. Rotinec
Assistant Examiner—Ernest F. Karlsen
Attorney—Buckhorn, Blore, Klarquist and Sparkman ABSTRACT: A continuity tester particularly suitable for testing bipolar transistors and semiconductor diodes is disclosed having a visual display including four test information indicator lamps arranged in a square with green lamps at adjacent corners of the square and red lamps at the remaining corners. A fifth indicator lamp functioning as a test mode indicator lamp is positioned in the center of the square. A circuit automatically applies an alternating current test voltage across the emitter-base and base-collector terminals of the transistor during first test mode time intervals and also turns on the second test mode indicator lamp and applies the test voltage across the collector-emitter-terminals during alternate second test mode time intervals which alternate with the first time intervals. Current flow, if any, and its direction of flow between the various terminals of the transistor causes lighting of certain of the test information indicator lamps during each of the two test mode time intervals. The color and position of the lamps thus lighted indicates whether the transistor is a good NPN transistor or a good PNP transistor and, if not, the nature of the defect. Diodes are similarly tested by applying the test voltage across their terminals during the second test mode intervals.

MILTON E. THURMAN, JR
INVENTOR

BY
BUCKHORN, BLORE, KLARQUIST & SPARKMAN
ATTORNEYS

SEMICONDUCTOR TESTER HAVING VISUAL DISPLAY

BACKGROUND OF INVENTION

Prior testers for semiconductor devices have, in general, been of two types. One of these types measures the conductive properties between the various terminals of the semiconductor device to determine whether the device is operative and a second type measures one or more performance characteristics of the device, such as the current gain of a transistor, and more elaborate testers even include a display of a family of characteristic curves on the screen of a cathode-ray oscilloscope.

The prior testers in general have required the manual switching of connections to the terminals of the semiconductor devices being tested between various tests and also the manual selection of the values and polarity of the test voltages or currents employed. The required manual manipulation of various knobs or pushbuttons is time consuming and subject to error.

In accordance with the present invention a simple semiconductor tester is provided which merely requires that the tester be turned on by a switch and the semiconductor be plugged into a socket or otherwise connected to the appropriate terminals of the tester. The connecting of the semiconductor device to the tester can be done while the tester is turned on without danger or injury to the semiconductor device or the tester and, with a bipolar type of transistor for example, the tester itself will indicate whether it is a NPN or a PNP transistor, providing the transistor is at least partly operative, or will indicate the direction of conductance of an operative diode.

A display made up of five indicators each having two display conditions, for example, electric lamps having an off or nonlighted condition and an on or lighted condition is employed in the particular tester illustrated to provide visual test information. This particular combination has the capability of 256 different information indication patterns dependent upon the nature of the information signals supplied to the indicator circuit and can be employed in other environments to display information of various kinds. More indicating lamps or other indicators can be added and, for example, one additional indicator can be employed to increase the number of possible indicating patterns to a very much greater number.

It is therefor an object of the invention to provide a system for providing an improved information display and an improved tester for semiconductor devices which is particularly adapted for utilizing such display.

BRIEF DESCRIPTION OF THE DRAWINGS

FIG. 3 is an abridged schedule of indicator display patterns and their meaning as applied to bipolar transistors.

Referring to FIG. 1, the embodiment of the semiconductor tester shown includes a power supply 10 which supplies direct current power to a free running multivibrator 12 which in turn controls a plurality of electronic switches 14, 16, 18 and 20 marked Switch 1, Switch 2, Switch 3 and Switch 4, respectively. The multivibrator 12 provides two output square waveforms 22 and 24 of opposite phase and the connections are such that switches 14 and 18 are conductive when the waveform 22 is at its most positive potential, and switches 16 and 20 are conductive when the waveform 24 is at its most positive potential, it is being understood that the respective switches are nonconductive when the waveforms 22 and 24 applied thereto are at their most negative potential.

Figure 1:
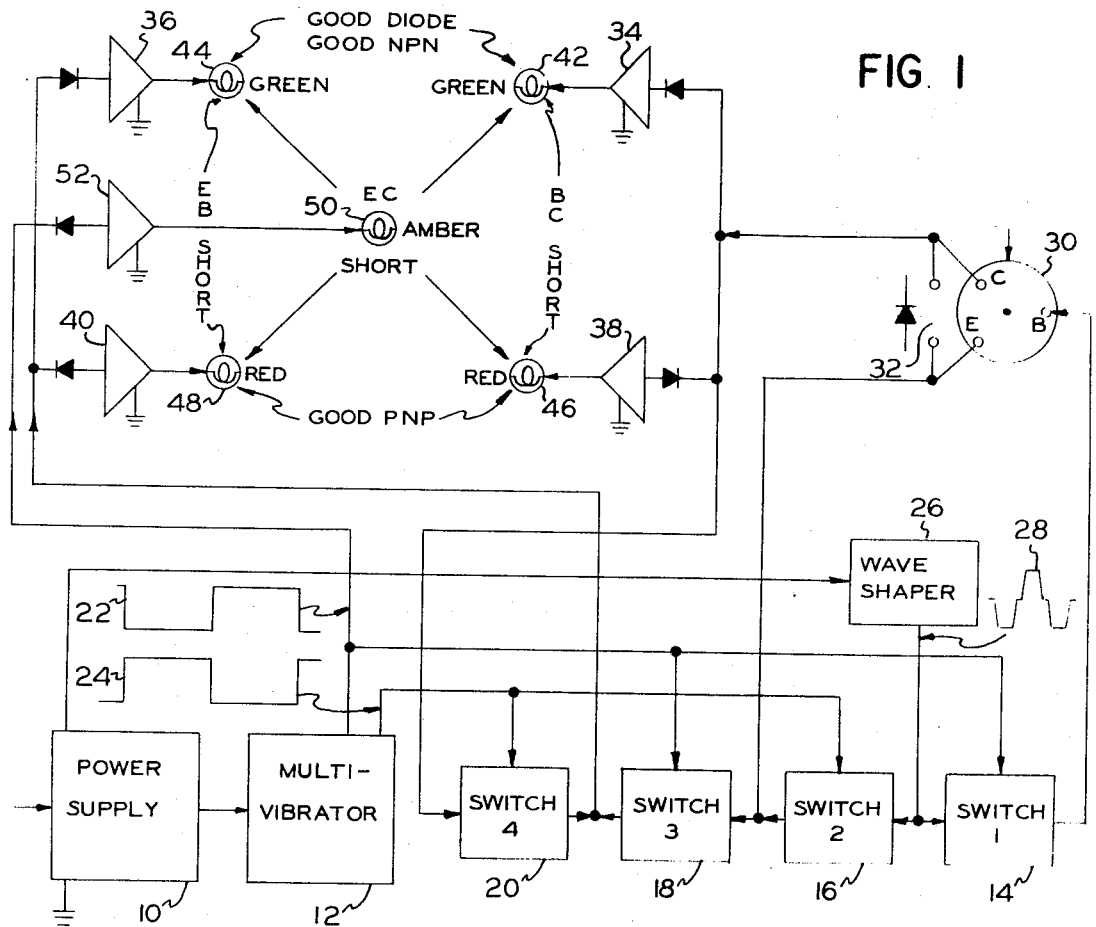
FIG. 1 is a block diagram of a semiconductor device tester utilizing the information display system of the present invention.

The power supply also furnishes an alternating current voltage to a wave shaper 26 which provides a low voltage clipped alternating current output voltage waveform 28 which is employed as a test or interrogation voltage. The switches 14 to 20 inclusive control the application of the voltage waveform 28 across selected terminals of a semiconductor device which may be plugged into a suitable socket 30 if the semiconductor device is a bipolar transistor, or in the case that the semiconductor device is a diode, it can be connected between terminals 32.

For convenience, the invention will be described in connection with junction-type transistors and diodes. Any resulting currents which flow through the various junctions of a junction type of transistor or through the junction of a diode being tested actuates one or more of the amplifiers 34, 36, 38 and 40 which in turn control the test information indicator lamps 42, 44, 46 and 48, respectively. It is to be noted that the amplifiers 34, 36, 38 and 40 are polarized. This is indicated by the diodes shown in the inputs to the various amplifiers. These diodes indicate the direction of current flow which will cause the amplifiers to turn on their respective lights 42, 44, 46 and 48. The actual diodes which polarize the amplifiers are the emitter-base junctions of normally cutoff input transistors in the amplifiers as will be described with reference to FIG. 2.

Another indicator lamp 50, which is preferably centrally disposed with respect to the lamps 42, 44, 46 and 48, functions as a test mode indicator lamp. The lamp 50 is controlled by another amplifier 52 which also has a diode shown in its input to indicate the direction of current flow which causes the amplifier to turn on the lamp 50. A first mode operation of the tester is indicated when the indicator lamp is turned off, i.e. unlighted. A second mode operation is indicated when the lamp 50 is lighted. This second mode indication occurs when the output waveform 22 from the multivibrator 12 is at its most negative potential.

For purposes of explanation, it will be assumed that a good NPN transistor is plugged into the test socket 30. In the first mode operation, i.e. when the lamp 50 is turned off, the switches 14 and 18 are conductive and the test waveform voltage 28 is applied through the switch 14 to the base terminals of the socket 30 and the transistor therein. The collector terminals of the socket 30 and the transistor therein are connected to the amplifiers 34 and 38 and the emitter terminals of the socket 30 and transistor therein are connected through the switch 18 to the amplifiers 36 and 40. If the base-collector junction is conductive, i.e. not open-circuited, current will flow during alternate half cycles of the voltage waveform 28 through this junction and the amplifier 34 to cause the lamp 42 to be lighted. Similarly, current will flow during alternate voltage half cycles of this waveform through the base emitter junction of the transistor, through the conducting switch 18 and the amplifier 36 to turn on the lamp 44. No current will flow through the amplifiers 36 and 38 so that the lamps 46 and 48 will not be lighted. The switches 16 and 20 do not conduct signal currents during the first mode operation.

If either of the base-collector or emitter-base junctions of the transistor being tested are open-circuited during the first mode test, the respective lights 42 and 44 will not be lighted. On the other hand, if the base-collector junction is short-circuited, current will flow during alternate half cycles of the voltage waveform 38 through the amplifier 38 so that the lamp 46 will also be lighted as well as the light 42, and if the emitter-base junction is short-circuited, current will flow in a direction so that amplifier 40 will cause lighting of the lamp 48. The first mode test operation thus gives full information with respect to whether either or both of the base-collector and emitter-base junctions are operating correctly or are open-circuited or short-circuited. It will be noted that it is the lighting of the lamps 42 and 44 and the failure to light the lamps 46 and 48 which indicates that the transistor being tested is an NPN transistor and that the base-collector and emitter-base junctions are individually in operating condition.

In the second mode test operation, the lamp 50 is lighted and the switches 16 and 20 are conductive while the switches 14 and 18 are nonconductive. Under these conditions, the test waveform voltage 28 is applied through the switch 16 to the emitter terminals of the socket 30 and the transistor therein. The switch 20 connects the amplifiers 36 and 40 to the collector terminals of the socket 20 and the transistor therein. If the transistor is a good transistor, whether it be an NPN or PNP transistor, no current will flow between the emitter terminal and the collector terminal of the transistor and none of the lamps will be lighted. If either the base-collector or the emitter-base junction are short-circuited, current will flow in one direction between these terminals and, if there is a short circuit directly between the emitter-collector terminals, current will flow in both directions. Thus if the emitter-collector terminals are directly short-circuited or both the base-collector and emitter-base junctions are short-circuited, all of the lamps 42, 44, 46 and 48 will be lighted.

If the transistor is an NPN transistor and the emitter-base junction is shorted, current will flow through the base-collector junction and the amplifiers 34 and 36 to cause the lamps 42 and 44 to be lighted. On the other hand, if it is the base-collector junction which is short-circuited, current will flow through the amplifiers 38 and 40 so that the lamps 46 and 48 are lighted.

The indications for a PNP transistor are the inverse of the indications resulting from testing an NPN transistor. For example, a good NPN transistor undergoing test will cause the lamps 42 and 44 to be lighted during first mode operation whereas a good PNP transistor undergoing test will cause the lamps 46 and 48 to be lighted.

A good diode undergoing tests by being connected across the terminals 32 will, if correctly marked and correctly positioned in accordance with such mark, not cause any lamps to be lighted during the first test mode operation but will cause the lamps 42 and 44 to be lighted when the mode indicator lamp 50 is lighted to indicate the second test mode. If the diode is open-circuited, no lamps 42, 44, 46 or 48 will be lighted in either mode and if the diode is short-circuited, all of the lamps 42, 44, 46 and 48 will be lighted during the second test mode operation only.

A few of the various test patterns for possible conditions of bipolar transistors of the NPN or PNP type are shown in FIG. 3. Each rectangle shows the pattern of the five indicator lights during the pattern of the first test mode operation of a transistor at the top of the rectangle and the pattern of indicator lamps for the second mode operation at the central portion of the rectangle. Each rectangle also contains an explanation of the meaning of the indication, the O meaning an open circuit, the G meaning good and the S meaning a short circuit. In each case, a circle with a cross therein means a lighted lamp. All of the possible test patterns are not illustrated, thus there are 21 commonly encountered test patterns for transistors and 3 for diodes, all of which can easily be derived using the above statement of operation.

Figure 2:
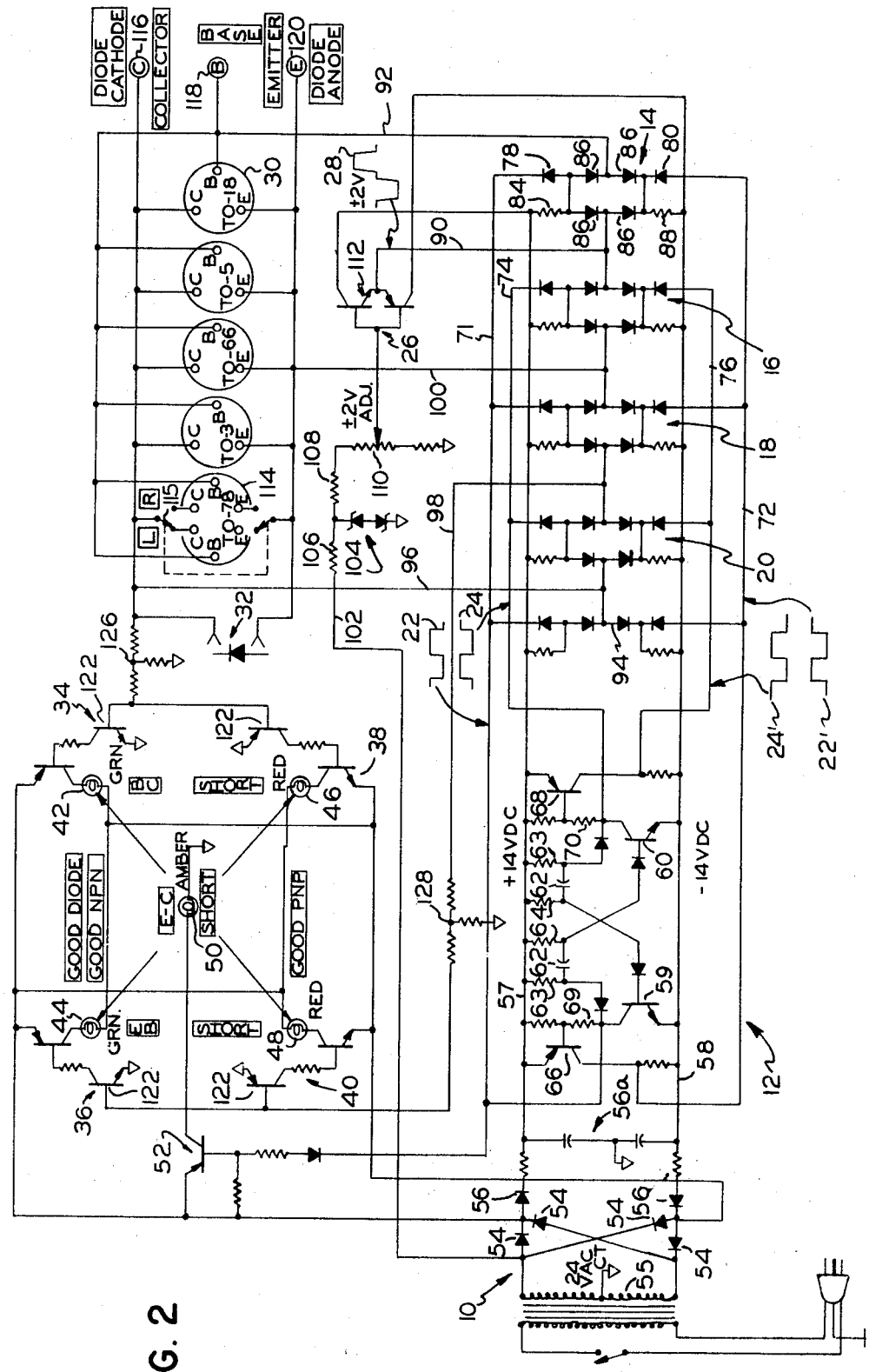
FIG. 2 is a schematic wiring diagram of the circuit of the tester of FIG. 1.

The complete schematic diagram of the tester of the block diagram of FIG. 1 is shown in FIG. 2. The power supply 10 is a conventional full wave type employing rectifier diodes 54 supplied from the secondary 55 of a transformer, which has a center tap connected to the circuit ground. The power supply provides positive and negative full wave rectified pulsating direct current voltages to the amplifiers 34, 36, 38, 40 and 52 and also provides filtered positive and negative DC voltages to the multivibrator 12 and switches 14, 16, 18 and 20 through rectifier diodes 56, a resistance-capacitance filter circuit 56a and conductors 57 and 58, respectively.

The multivibrator 12 is of the free running or astable type including NPN transistors 59 and 60 connected in circuit between the conductors 57 and 58. The multivibrator includes coupling or feedback circuits from the collector of each transistor to the base of the other transistor, each including a capacitor 62 and resistors 63 and 64. The time constant of each of the circuits including a capacitor 62 and resistor 64 is such that the multivibrator square wave output voltage has half cycles which are a material portion of a second, for example, one-half second in duration in order that each of the test modes above described persist for a sufficient time interval that the two modes can be easily distinguished visually. That is to say, the indicator lamps which are lighted in a given test stay on long enough that the results of the test of each of the test modes can be separately recognized.

Phase reversing transistors 66 and 68 have their bases connected through resistor networks 69 and 70, respectively, to the collectors of the transistors 59 and 60, respectively, and are otherwise connected between the conductors 57 and 58 so that the voltage waveform 22 and its phase inversion 22' are produced between the conductors 71 and 72, respectively, and the circuit ground and the voltage waveform 24 and its phase inversion 24' are produced between the conductors 74 and 76, respectively, and the circuit ground. It will be apparent that the switches 14, 16, 18 and 20 are each a bridge type of diode switch. When the conductor 71 is positive and the conductor 72 negative, the diodes 78 and 80 forming part of the switch 14 are cut off. Under these conditions current flows from the positive side of the power supply through the conductor 57, resistor 84, switch diodes 86 and resistor 88 to the negative side of the power supply through the conductor 58. The diodes 86 all conduct and the alternating voltage test signal output 28 from the wave shaper 26 is connected through the conductor 90, the switch 14 and the conductor 92 to the base terminal of a plurality of transistor sockets, one of which may be the socket 30 of FIG. 1. When the multivibrator produces a negative potential on the conductor 71 and a positive potential on the conductor 72, the diodes 86 of the switch 14 are cutoff so that this switch becomes nonconducting. The other switches 16, 18 and 20 work in an entirely similar manner and will not be further described. A half switch connection 94 is shown at the left end of the switch assembly of FIG. 2. During the first mode test this half switch is conductive so that the signal transmitted through the conductor 96 encounters the same impedance conditions as the signal transmitted through the conductors 98 and 100 and the switch 18 which is conductive during the first mode test. During the second mode test this half switch is nonconductive so that its impedance will not load the conductor 96 during the second mode test.

The input of the wave shaper 26 is connected across the upper half of the secondary winding 56 of the power supply transformer through the conductor 102 and circuit ground. This wave shaper includes a pair of Zener diodes 104 which in combination with a pair of resistors 106 and 108 provide a clipping circuit which clips the positive and negative peaks of the sine wave alternating current signal delivered to the wave shaper 26. This signal after being attenuated by a circuit including a potentiometer 110 is employed to drive a pair of transistors 112, one of which is an NPN and the other is a PNP transistor. The output voltage waveform 28 is taken from the emitters of the two transistors which provide a low impedance source for the clipped alternating voltage waveform 28 which, for example, may have an amplitude of ±2 volts or 4 volts peak to peak.

The various sockets shown in addition to the socket 30 are for transistors of different sizes or connection arrangements and include a double socket 114 and switch 115 for dual transistors. Terminals 116, 118 and 120 are also provided for connecting to the tester transistors not fitting the sockets provided or for testing transistors or diodes without removing them from a circuit in which they have been installed.

The amplifiers 34, 36, 38 and 40 controlling the lamps 40, 42, 46 and 48, respectively, each include a pair of transistors, input transistor 122 of each of which is normally cutoff. The base-emitter diode of each transistor 122 thus functions as the diode shown at the input of each of the amplifiers 34, 36, 38 or 40 of FIG. 1. For example, the lamp 42 is turned on only when current can flow through a circuit including the semiconductor under test and the diodes of the base-emitter junction of the input transistor 122 of the amplifier 34 to turn on such transistor and thus turn on the other or output transistor of such amplifier. In each case the signal reaches the bases of the transistors 122 through an attenuator network 126 or 128. It will be apparent that the amplifiers 34, 36, 38 and 40 actually operate as switches to connect the various lamps 42, 46, 44 and 48 across the direct current output of the power supply 10. The amplifier 52 also connects the lamp 50 across the positive direct current supply and the circuit ground during each second test mode operation.

The tester above described can be employed to test all types of diodes and bipolar transistors as well as unijunction transistors without damage to such devices. In the case of certain germanium power transistors the leakage currents are sufficiently high that reverse conductivity or short circuit test results are obtained with transistors which will operate satisfactorily in circuits designed for them. In the specific tester circuit disclosed, values of the various resistors and other components in the circuit including the resistors forming part of the switches 14, 16, 18 and 20 as well as the half switch 94, and also the values of the switch operating voltages from the multivibrator and the voltage of the test waveform 28 are selected so that a reverse current flow of 2 ma. through any junction of a semiconductor under test will produce a short circuit indication in addition to indicating proper forward current flow through such junction. In the case of the germanium power transistors above referred to, the tester indicates when a leakage current exceeds 2 ma., and if necessary further indications by other test procedures can be made.

While the tester is not intended to test field effect transistors or such devices as silicon controlled rectifiers, etc., it is possible to make a test to determine the test patterns for a known good device of any of these types and compare the test patterns of other similar devices with that for one known to be good.

I claim:

1. A device for producing a visual information display having a plurality of display modes, comprising:
    display mode indicator means for providing a plurality of visual display mode indications;
    information indicator means including a plurality of information indicators each having a first visual indication changeable to a second visual indication in response to an electric information signal;
    mode control means for causing said display mode indicator means to repetitively provide a series of said visual display mode indications at a rate at which each said visual display mode indication is separately visible for a predetermined time interval;
    and display control means responsive to said mode control means for providing a set of electric information signals corresponding to each said visual display mode indication and for supplying the information signals of the set of information signals corresponding to each such visual display mode indication to selected information indicators of said information indicator means during the time interval for such visual display mode indication;
    said display control means including means to cause information signals of each of said set of information signals to be supplied to at least certain of the same information indicators of said plurality of information indicators for causing the same plurality of indication indicators to provide different visual information in each of said visual display modes.

2. A device in accordance with claim 1 in which said information indicators are arranged around a central position and said display mode indicator means occupies said central position.

3. A device in accordance with claim 1, in which said mode indicator means and said information indicators include electric lamps each providing a first visual indication when turned off and a second visual indication when turned on and in which said information indicators are arranged around said mode indicator means.

4. A device for producing a visual information display, comprising:
    display mode indicator means for providing a plurality of visual display mode indications;
    information indicator means including a plurality of information indicators each having a first visual indication changeable to a second visual indication in response to an electric information signal;
    mode control means for causing said display mode indicator means to repetitively provide a series of said visual display mode indications at a rate at which each said visual display mode indication is separately visible for a predetermined time interval;
    and means responsive to said mode control means for providing a set of electric information signals corresponding to each said visual display mode indication and for supplying the information signals of the set of information signals corresponding to each such visual display mode indication to selected information indicators of said information indicator means during the time interval for such visual display mode indication;
    said device being a semiconductor device tester means in which said means responsive to said mode control means includes means for supplying a first set of information signals causing said information indicators to indicate the conductive properties between a selected pair of terminals of said semiconductor device when said mode indicator indicates a first test mode and means for supplying a second set of information signals causing said information indicators to indicate the conductive properties between another selected pair of terminals of said semiconductor device when said mode indicator indicates a second test mode.

5. A device for producing a visual information display, comprising:
    display mode indicator means for providing a plurality of visual display mode indications;
    information indicator means including a plurality of information indicators each having a first visual indication changeable to a second visual indication in response to an electric information signal;
    mode control means for causing said display mode indicator means to repetitively provide a series of said visual display mode indications at a rate at which each said visual display mode indication is separately visible for a predetermined time interval;
    and means responsive to said mode control means for providing a set of electric information signals corresponding to each said visual display mode indication and for supplying the information signals of the set of information signals corresponding to each such visual display mode indication to selected information indicators of said information indicator means during the time interval for such visual display mode indication;
    said mode control means including a free running multivibrator and a plurality of electrically operated switches controlled by output voltages from said multivibrator for applying a test signal voltage across a selected pair of terminals of a device under test to produce said first set of information signals in the form of current flow between the pair of selected terminals when said mode indicator indicates a first test mode and for applying a test signal voltage across another selected pair of terminals of said test device to provide said second set of information signals in the form of current flow between the other selected pair of terminals when said mode indicator indicates a second test mode.

6. A device in accordance with claim 5, in which the electrically operated switches are diode bridge electronic switches.

7. A device in accordance with claim 5, in which said means for applying a test signal voltage includes means for producing an alternating test voltage having positive and negative half waves of equal amplitude and means responsive to the direction of current flow between said selected terminals to cause said indicators to change from a first visual indication to a second visual indication.

8. A device in accordance with claim 7, in which said information indicators are electric lamps and said means responsive to the direction of current flow includes an electronic switch means for each lamp, each switch means having an input transistor biased so that said switch means for each of said lamps turns on the lamp associated therewith in response to said current flow in one direction only.

9. A device in accordance with claim 7, in which said means responsive to direction of current flow includes a separate switch means responsive to direction of current flow for each information indicator and in which said control means when in one of said test modes has means for connecting two terminals of said semiconductor device undergoing test into a series test circuit with said means for producing an alternating test voltage and in series with each of a pair of said switch means which are responsive to current flow in opposite directions.

10. A device in accordance with claim 9, in which said control means connects the base-collector terminals of a transistor into a first series test circuit and the emitter-base terminals into a second series test circuit when said mode indicator indicates the first test mode and connects the emitter-collector terminals of said transistor into said second series test circuit when said mode indicator indicates the second test mode.